Oct. 30, 1923.
G. HORVATH
1,472,719
MACHINE FOR MAKING RADIATOR TUBES
Filed June 9, 1919    12 Sheets-Sheet 2
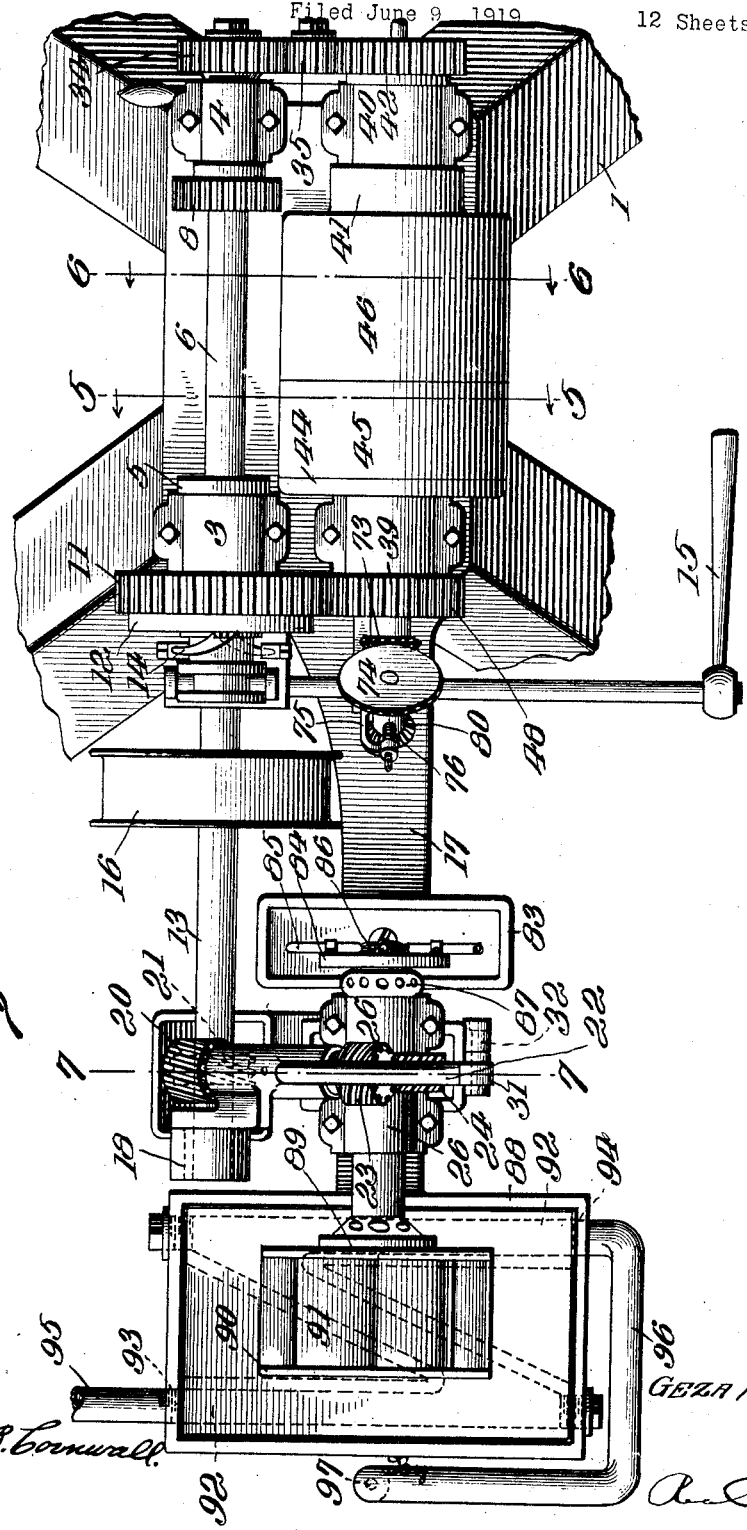
Inventor
GEZA HORVATH.

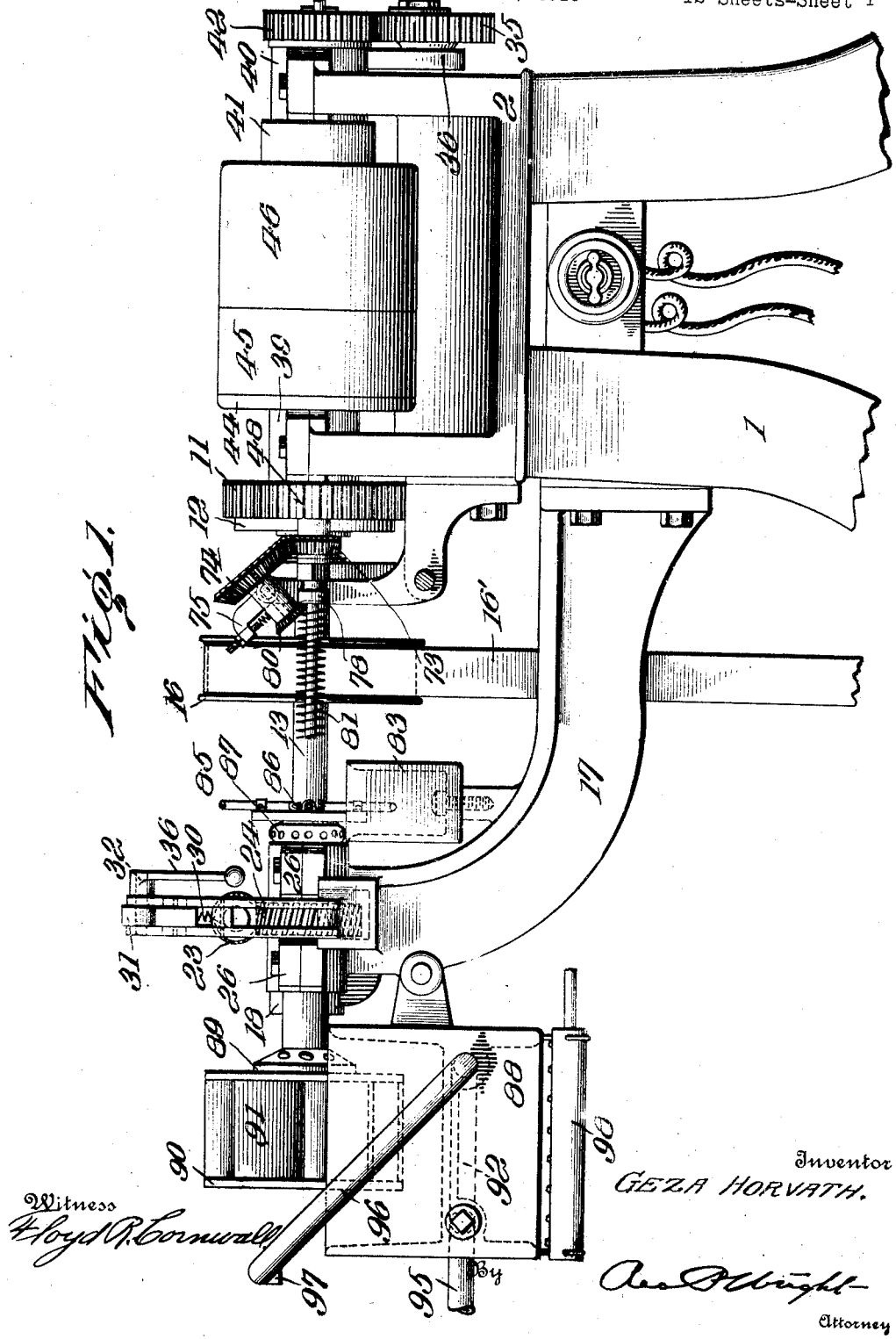

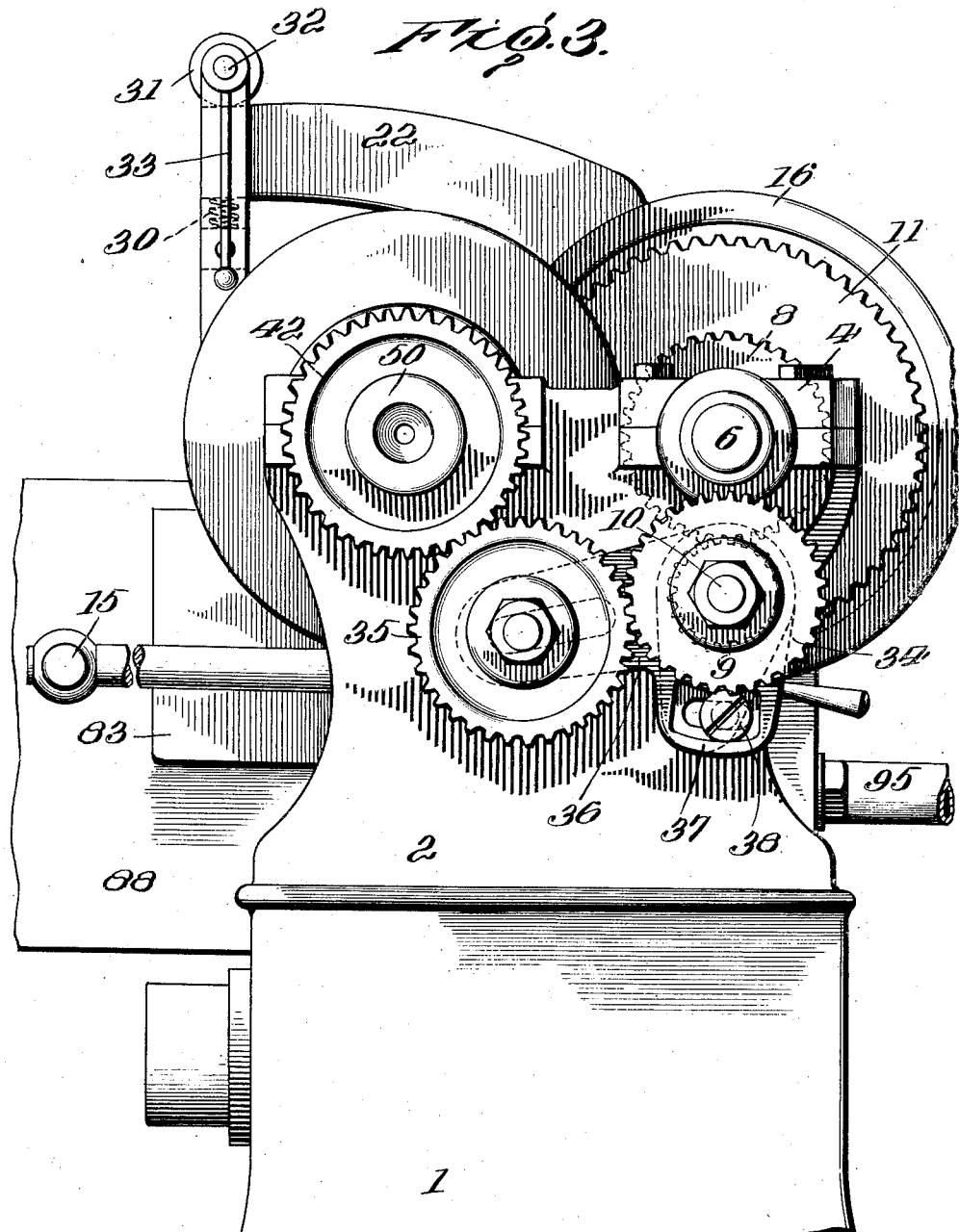

Oct. 30, 1923.
G. HORVATH
MACHINE FOR MAKING RADIATOR TUBES
Filed June 9, 1919
1,472,719
12 Sheets-Sheet 4
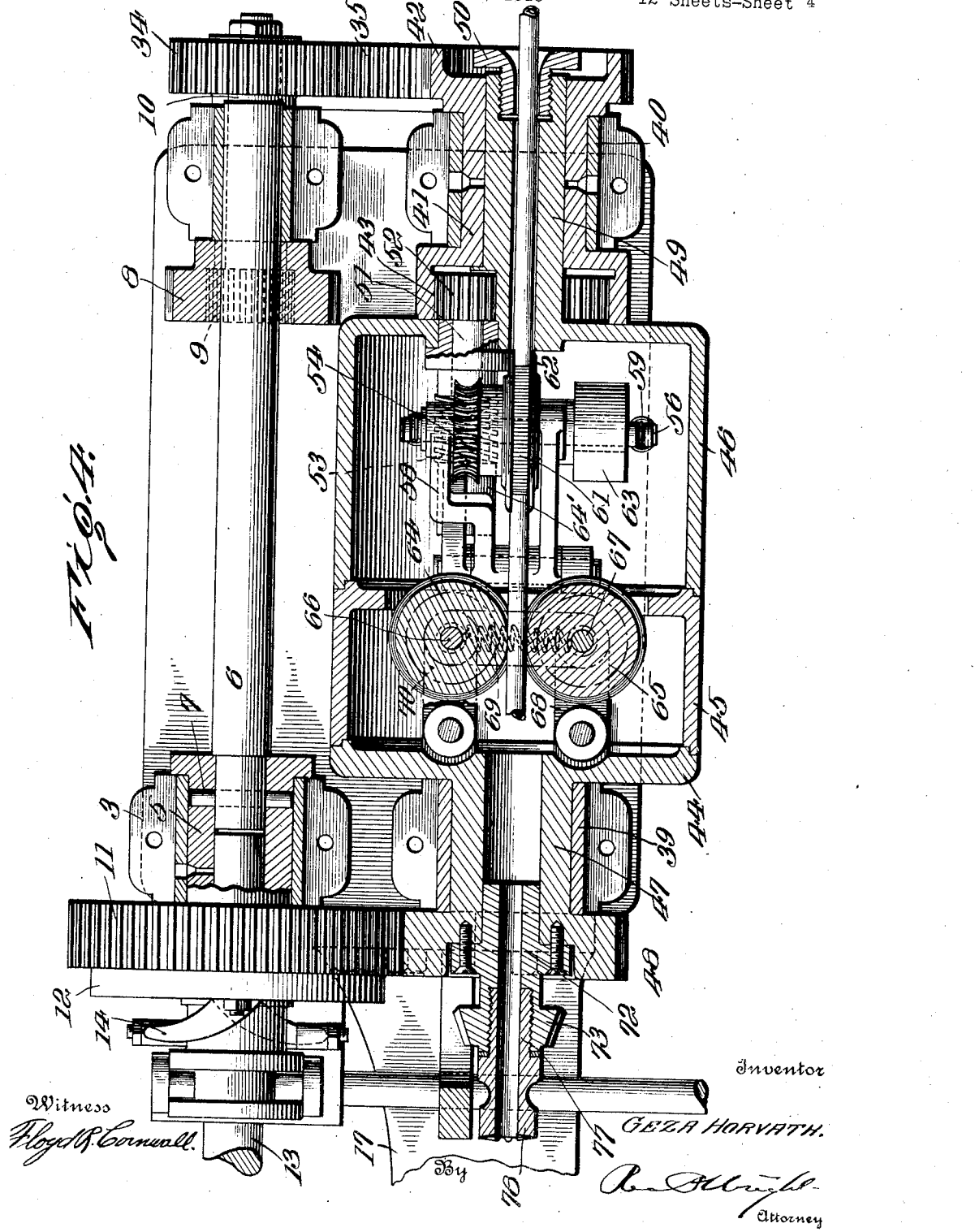

Oct. 30, 1923.
G. HORVATH
1,472,719
MACHINE FOR MAKING RADIATOR TUBES
Filed June 9, 1919    12 Sheets-Sheet 5
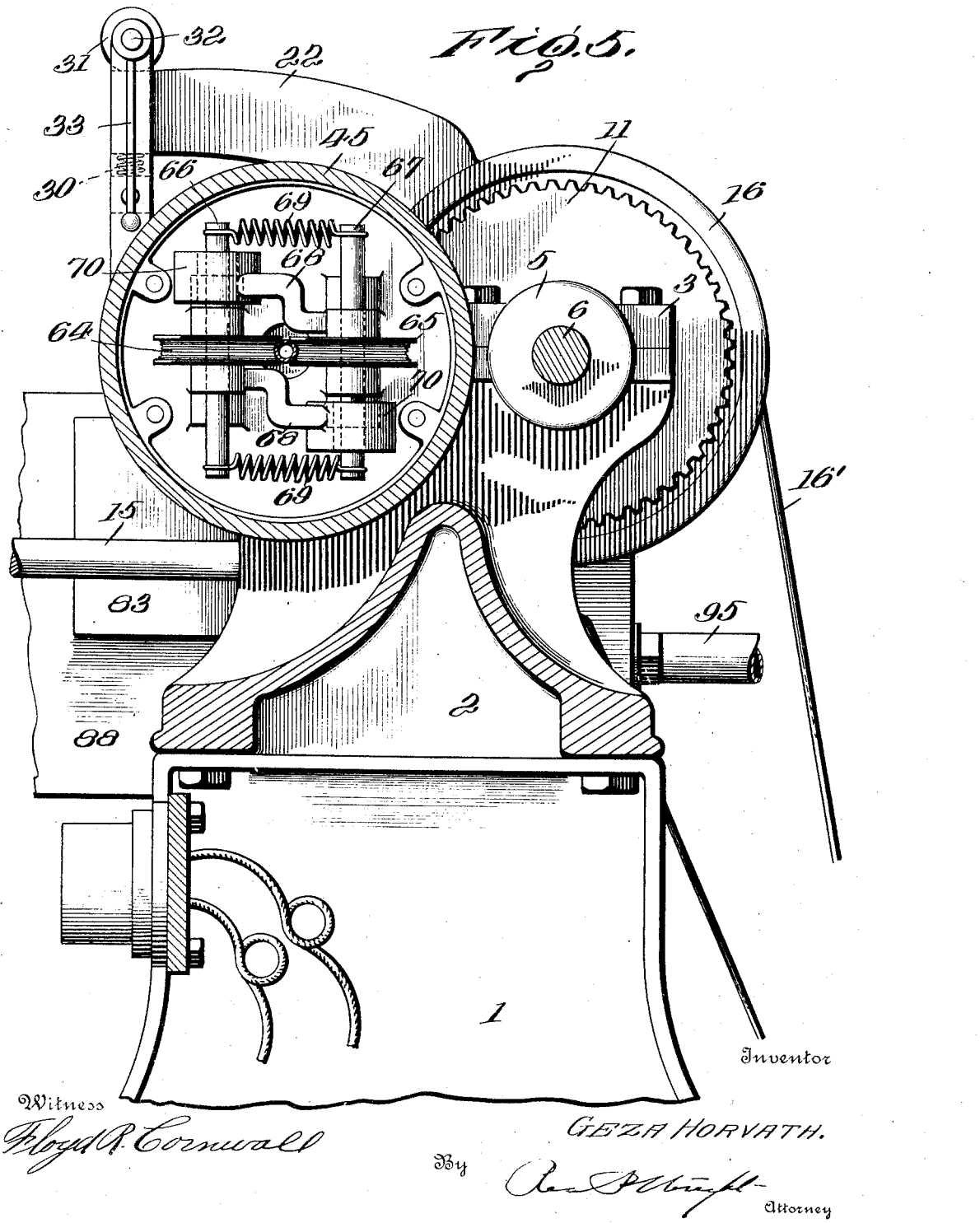

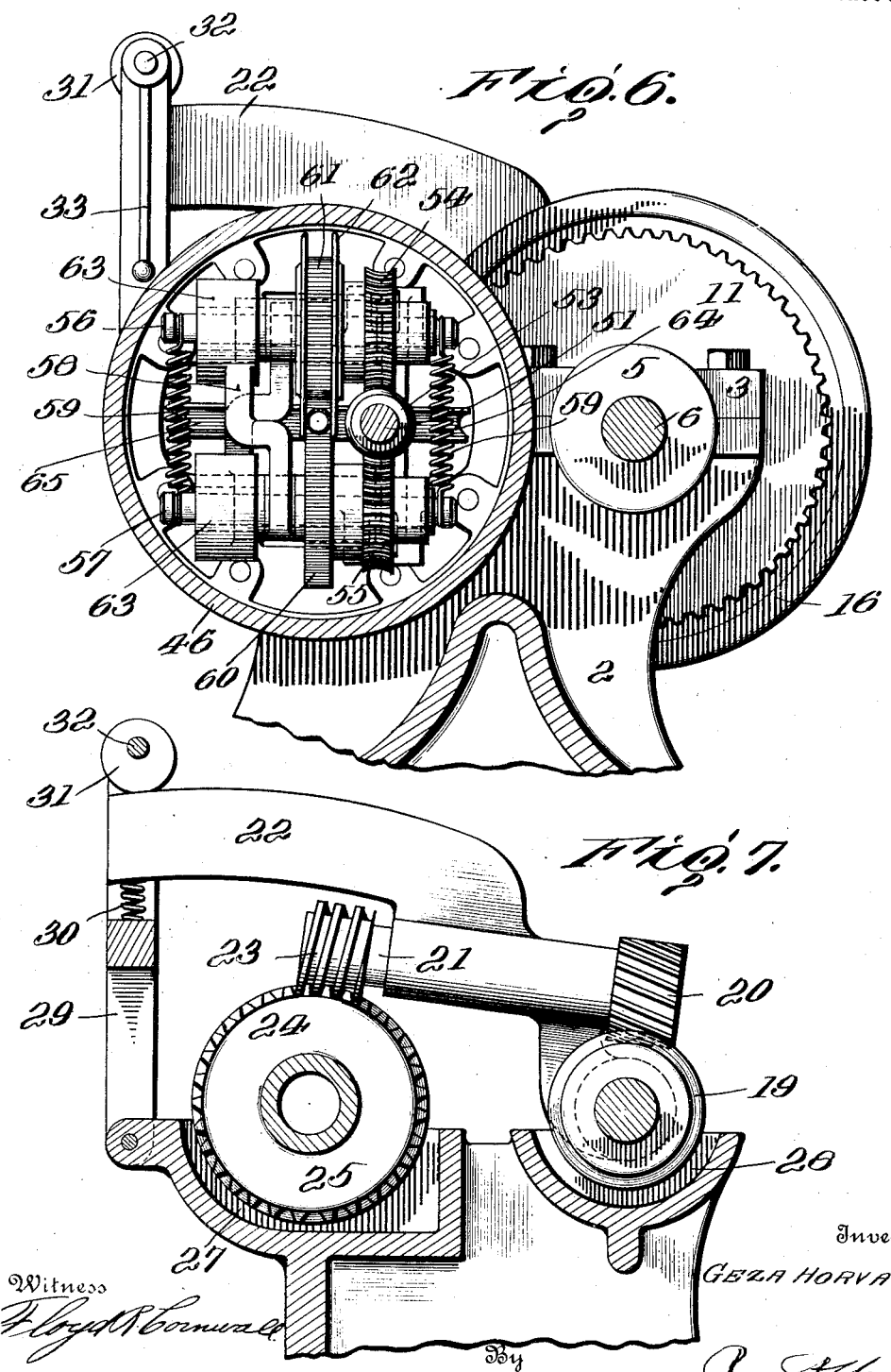

Oct. 30, 1923.
G. HORVATH
MACHINE FOR MAKING RADIATOR TUBES
Filed June 9, 1919    12 Sheets-Sheet 7

Inventor
GEZA HORVATH.

Oct. 30, 1923.  1,472,719
G. HORVATH
MACHINE FOR MAKING RADIATOR TUBES
Filed June 9, 1919   12 Sheets-Sheet 8
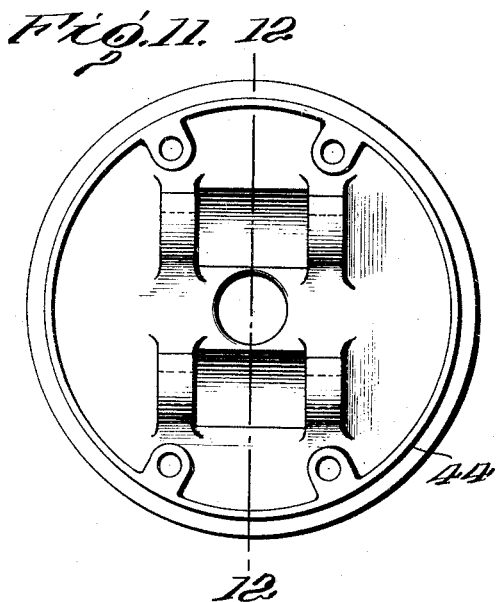
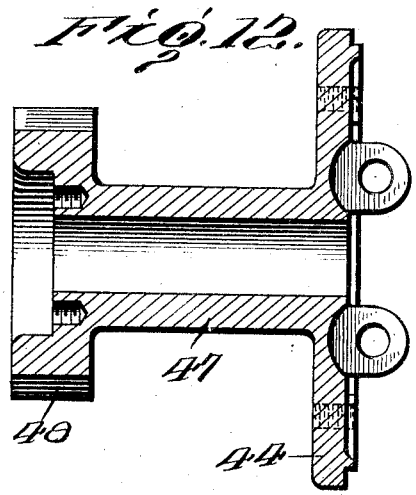
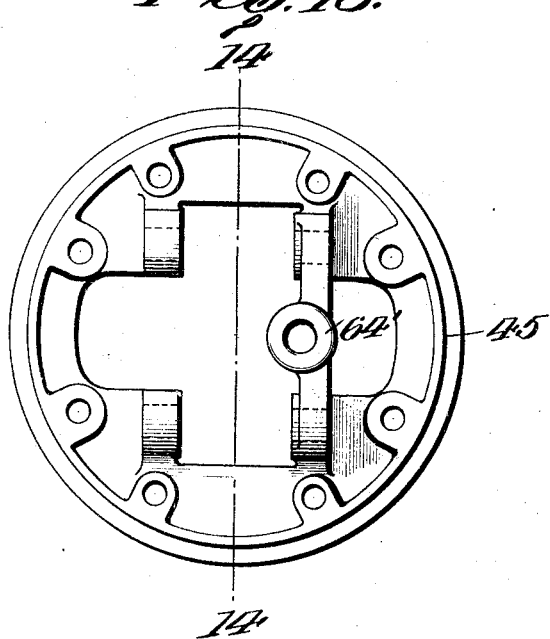
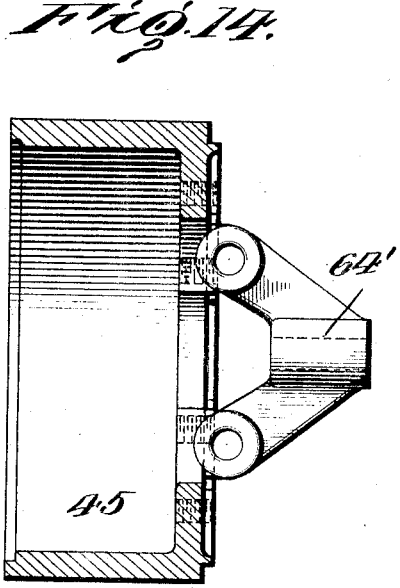
Inventor
GEZA HORVATH.

Oct. 30, 1923. 1,472,719
G. HORVATH
MACHINE FOR MAKING RADIATOR TUBES
Filed June 9, 1919 12 Sheets-Sheet 9
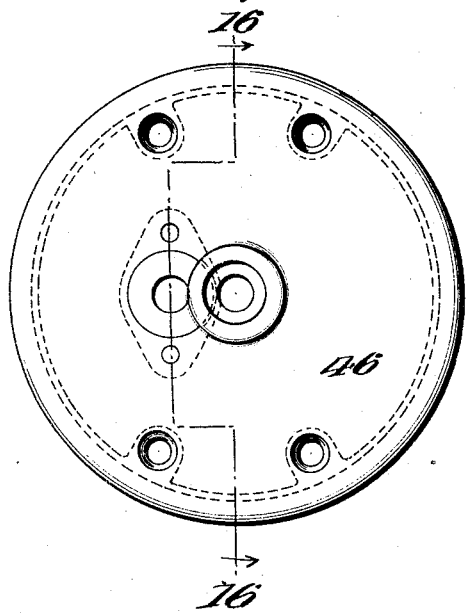
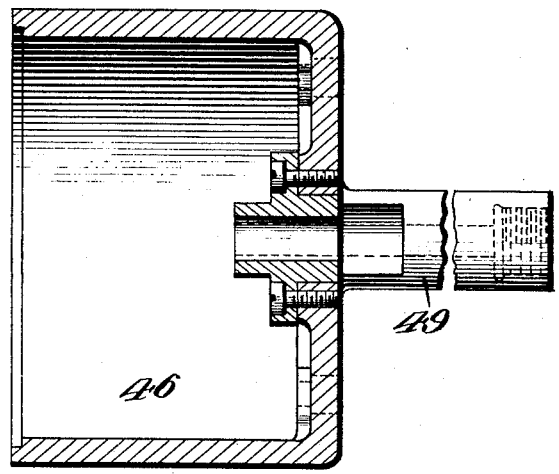
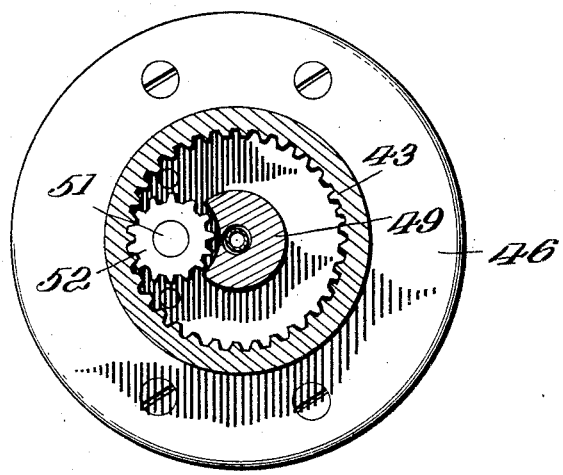
Inventor
GEZA HORVATH.

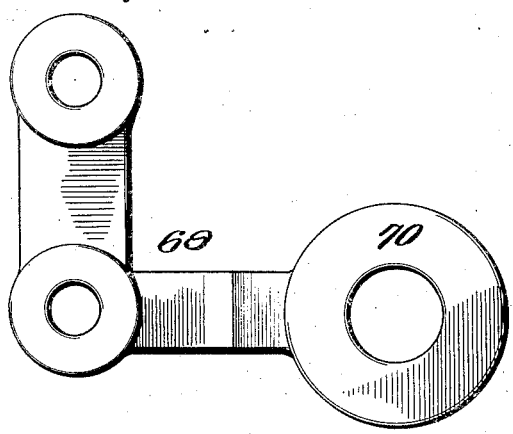
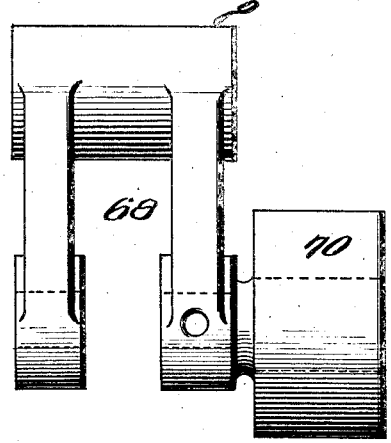
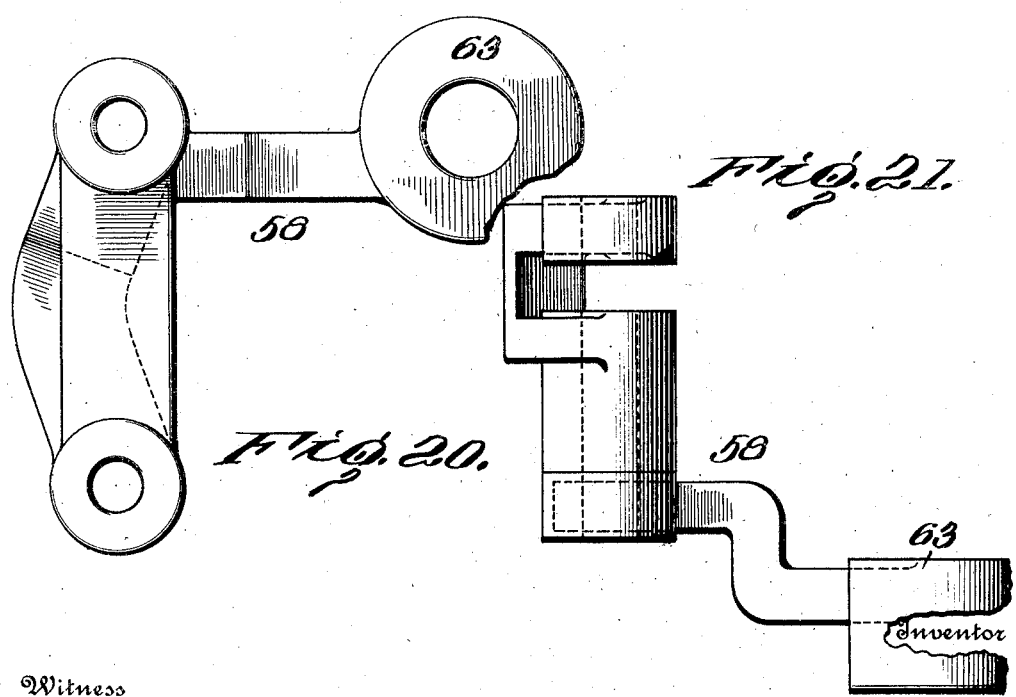

Oct. 30, 1923.  1,472,719
G. HORVATH
MACHINE FOR MAKING RADIATOR TUBES
Filed June 9, 1919    12 Sheets-Sheet 11
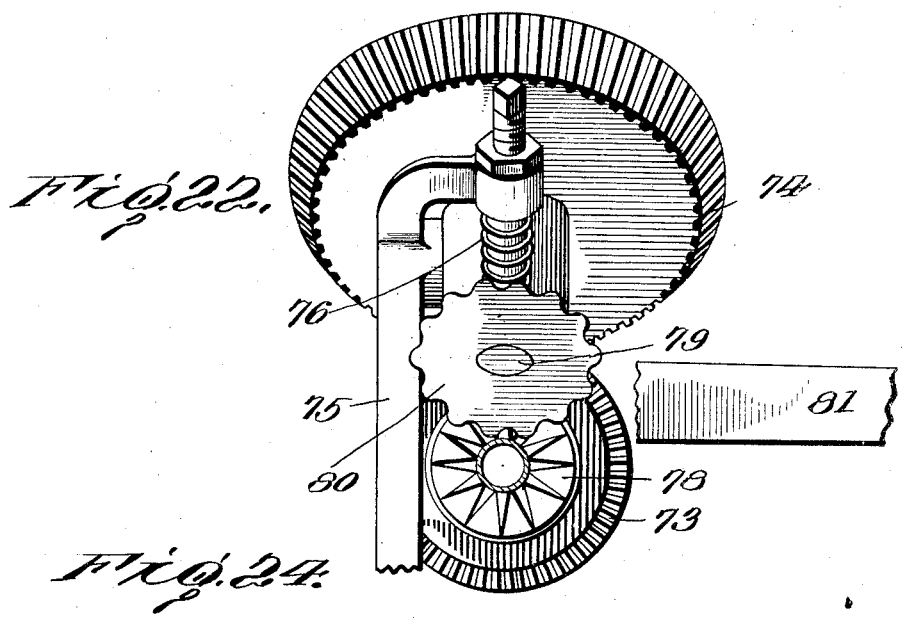
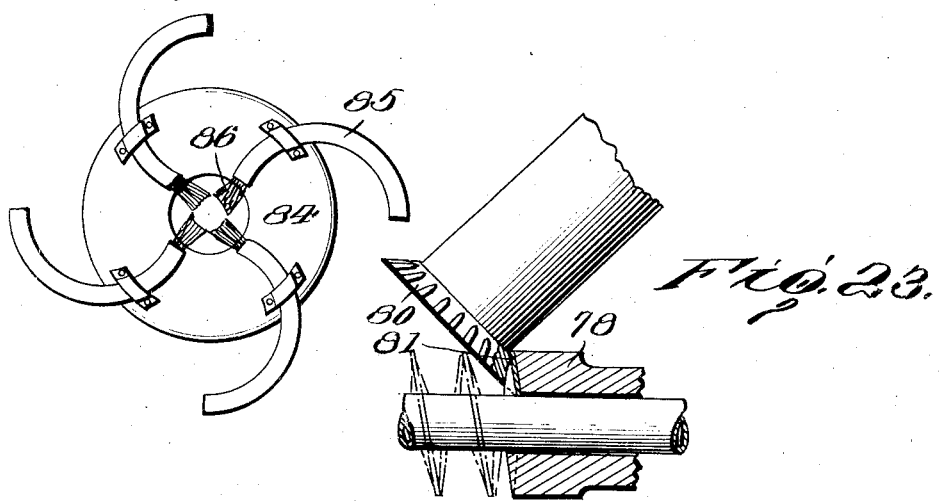
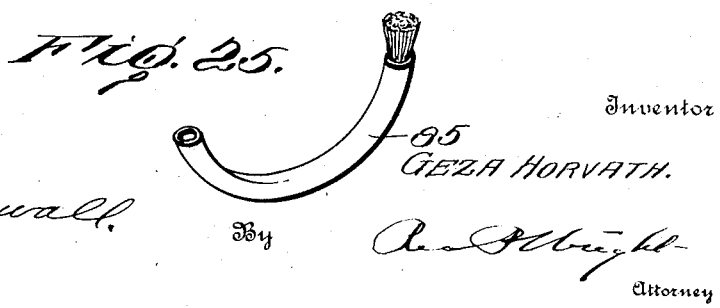
Witness
Floyd R. Cornwall
Inventor
GEZA HORVATH.
By
Attorney Oct. 30, 1923.
G. HORVATH
1,472,719
MACHINE FOR MAKING RADIATOR TUBES
Filed June 9, 1919   12 Sheets-Sheet 12
Fig. 26.
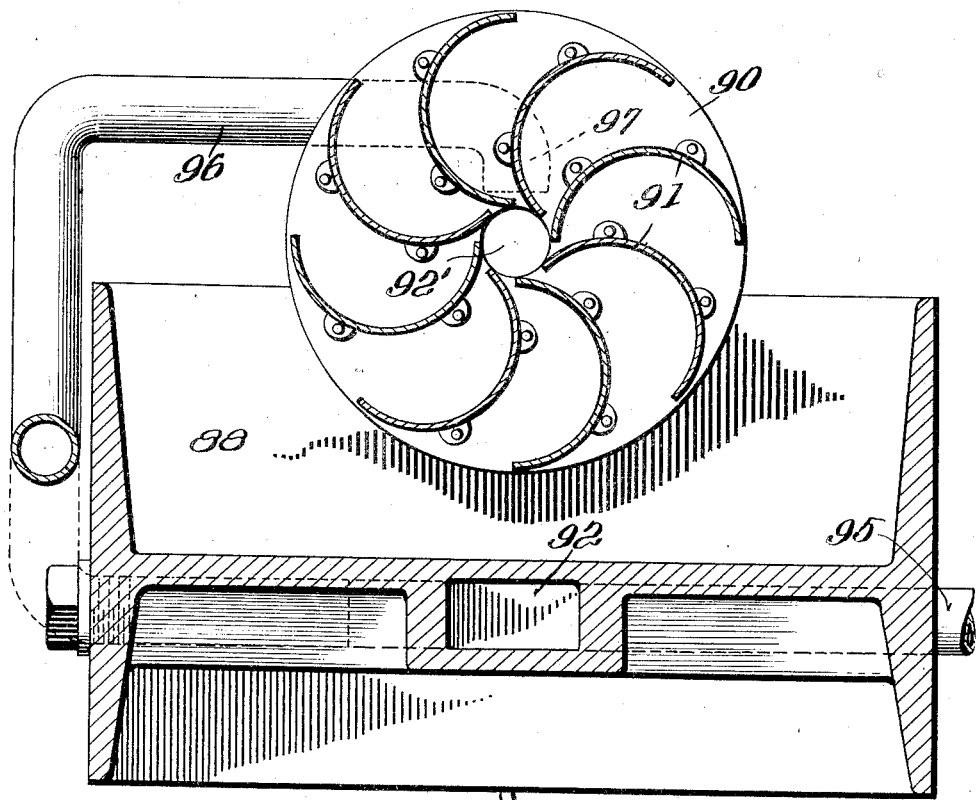
Fig. 27.
Fig. 28.
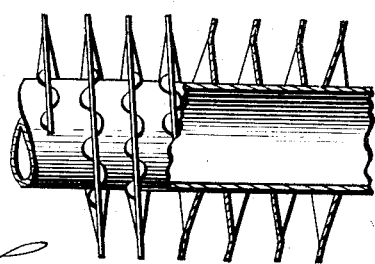
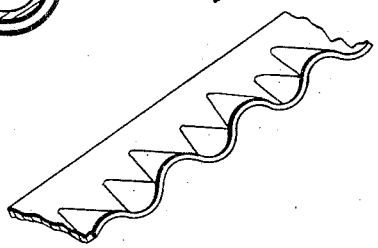
Inventor
GEZA HORVATH.
Witness
Floyd R. Cornwall.
By
Attorney Patented Oct. 30, 1923.

1,472,719

UNITED STATES PATENT OFFICE.

GEZA HORVATH, OF DETROIT, MICHIGAN.

MACHINE FOR MAKING RADIATOR TUBES.

Application filed June 9, 1919. Serial No. 302,779.

*To all whom it may concern:*

Be it known that I, GEZA HORVATH, a citizen of the United States, residing at Detroit, in the county of Wayne and State of Michigan, have invented certain new and useful Improvements in Machines for Making Radiator Tubes, of which the following is a specification, reference being had therein to the accompanying drawing.

This invention relates to machines for making radiator tubes which have extended radiating surfaces made of a strip or ribbon of thin sheet metal wound spirally around the tube proper, the object being to provide a machine which is very compact in form into which the tube is fed and rotated in such a manner that a strip of thin metal will be wound around the tube and secured thereon all in one operation.

Another and further object of the invention is to provide a machine which is so constructed that the ribbon of thin sheet metal is fed between a pair of plaiting rolls disposed in the path of travel of the tube so that one edge of the ribbon will be plaited so that it can be wound on the tube proper in order to provide a securing edge by means of which the same can be secured to the tube by solder in order to produce a strong radiator tube.

Another and further object of the invention is to provide a machine with novel means for feeding the tube forward while the same is being rotated so that the ribbon of thin metal can be placed or wound upon the tube.

A still further object of the invention is to provide novel means for applying acid to the tube and strip of ribbon before it reaches the solder bath.

Another and further object of the invention is to provide novel means for applying solder to the entire surface of the tube and strip in order to give the same a coating, means being provided for blowing the surplus solder therefrom before the tube leaves the machine.

A still further object of the invention is to provide a machine which has a capacity of turning out radiator tubes much quicker than prior constructions of machines, the tube being rotated at approximately nine hundred revolutions per minute, and as herein shown the coils have a pitch or encircle the tube six per inch so that twelve feet of tubing can be formed per minute.

Another and further object of my invention is to provide a machine by means of which the radiator tube can be formed continuously as by connecting the ends of the tubes as they are forced into the machine, a continuous tube will be formed which can be cut the desired length after it leaves the machine, and it will be seen that with the construction of machine herein shown and described any length of tubes can be fed to the machine or the tubes can be coupled, as in practice I have found that by providing a coupling member an additional tube can be joined to the end of the tube passing through the machine so that in reality a continuous tube having a helical flange will be formed.

Another and further object of the invention is to provide novel means for driving the feeding and revolving means so as to cause the same to rotate at different rates of speed.

Other and further objects and advantages of the invention will be hereinafter set forth and the novel features thereof defined by the appended claims.

In the drawings—

Figure 1 is a side elevation of a machine constructed in accordance with my invention showing a tube passing through the same.

Fig. 2 is a top plan view of the machine.

Fig. 3 is an end elevation.

Fig. 4 is a horizontal section showing the gripping and feeding rollers and the gearing for driving the same.

Fig. 5 is a vertical section taken on line 5—5 of Fig. 2.

Fig. 6 is a vertical section taken on line 6—6 of Fig. 2.

Fig. 7 is a vertical section taken on line 7—7 of Fig. 2.

Fig. 11 is an elevation of one end of the housing.

Fig. 12 is a section taken on line 12—12 of Fig. 11.

Fig. 13 is an elevation of the intermediate section of the housing.

Fig. 14 is a section taken on line 14—14 of Fig. 13.

Fig. 15 is an end elevation of the other end section of the housing.

Fig. 16 is a section taken on the line 16—16 of Fig. 15.

Fig. 17 is a section taken on the line 17—17 of Fig. 8.

Fig. 18 is an elevation of one of the arms carrying the counterbalancing weigths for the gripping rolls.

Fig. 19 is a plan view of the same.

Fig. 20 is an elevation of one of the arms carrying the counterbalancing weights for the feed rollers.

Fig. 21 is a plan view of the same.

Fig. 22 is an elevation of the plaiting rolls showing a flat strip of sheet metal in position to be fed between the same.

Fig. 23 is a detail view partly in section showing the plaiting rolls plaiting a strip as the tube is revolved so as to form a helical flange of thin sheet metal on the tube to provide an extended radiating surface.

Fig. 24 is a detailed elevation of the acid applying brushes.

Fig. 25 is a detailed perspective view of one of the brushes detached.

Fig. 26 is a large vertical section through the solder vat showing the solder applying means.

Fig. 27 is a detailed perspective of the ribbon showing how the same is plaited along one edge to take up the material and to enable the same to be wound spirally on a tube, and Fig. 28 is a detailed view partly in section of a radiator tube formed in my machine.

Figure 8:
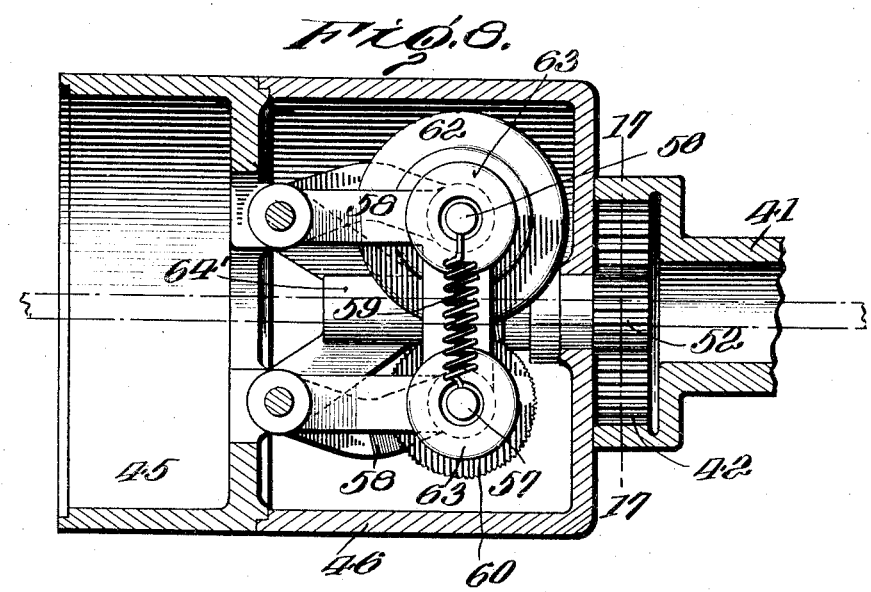
Fig. 8 is a detailed vertical section through the housing showing the feeding rollers and the counterbalancing weights for overcoming centrifugal force.
Figures 9, 10:
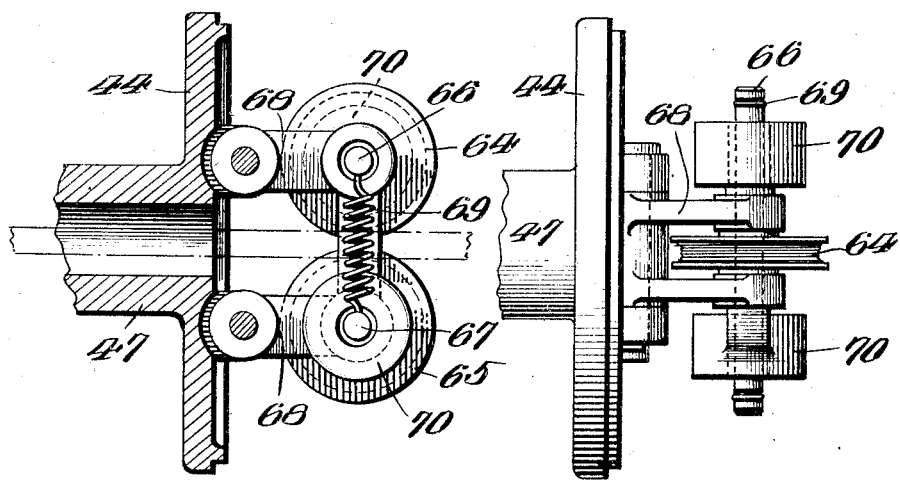
Fig. 9 is a detailed elevation of the gripping rollers, and counterbalancing weights.
Fig. 10 is a top plan view of the same.

In the drawings 1 indicates a stand on which is mounted a base 2 having suitable journal bearings 3 and 4. Mounted in the journal bearing 3 is a coupling member 5 in which one end of a shaft 6 is secured by pin 7, said shaft having its other end journaled in the bearing 4 and provided with a gear 8 meshing with a gear 9 mounted on a stud shaft 10 journaled in a suitable bearing formed on the base 2 below the bearing 4.

The coupling member 5 is provided with an integral gear 11 having a conical socket to receive a conical clutch member 12 which is keyed on a drive shaft 13 the end of which turns freely in the coupling member 5. The clutch member is operated by the ordinary clutch shifting mechanism 14 through the medium of a hand lever 15 which is clearly shown in Figs. 2 and 4. By this construction the shaft 6 can be driven from the driving shaft 13 through the medium of the clutch. The drive shaft 13 has a pulley 16 over which is adapted to pass a drive belt 16′ extending from a motor, but it is of course understood that any kind of driving means can be employed for driving the driving shaft, and in practice I preferably employ an electric motor, but of course I do not wish to limit myself to any particular manner of driving the shaft.

The stand has an arm 17 extending therefrom provided with a bearing 18 for the end of the drive shaft 13 and said shaft has a worm wheel 19 which meshes with a worm 20 carried by shaft 21 journaled in an arm 22 which is pivotally mounted on the shaft 13. The other end of the shaft 21 carries a worm 23 which meshes with worm wheel 24 having hub portions 25 which are journaled in suitable bearings 26 as clearly shown in Fig. 1, said worm wheel traveling in an oil receptacle 27 for keeping the same thoroughly lubricated. The worm wheel 19 also travels in an oil cup 28 for keeping the worm wheel and worm lubricated. The free end of the arm 22 extends through a pivoted yoke 29 which has arranged therein a coiled spring 30 which normally has a tendency to move the arm upwardly so as to move the worm 23 out of mesh with the worm wheel 24, the arm being held in adjusted position by a cam 31 carried by a shaft 32 which is provided with a hand lever 33, as shown in Fig. 1 and in the position shown in this figure the arm is held down against the tension of the spring which holds the worm 23 in mesh with the worm wheel 24 so as to drive the worm 24 for the purpose hereinafter fully described.

The stud shaft 10 carries a gear 34 which meshes with an idle gear 35 adjustably mounted in the arm 36 pivotally mounted on the stud shaft 10, said arm having a slotted extension 37 through which a locking screw 38 is adapted to pass for locking the arm in adjusted position so that the gears 34 and 35 will be in mesh. By this construction different size gears 35 can be used for increasing or decreasing the speed of the machine as will be hereinafter fully described.

Arranged on the base 2 of the machine are journal bearings 39 and 40 which are preferably in transverse alignment with the bearings 3 and 4, as shown in Figs. 1 and 4. Mounted within the journal bearing 40 is a sleeve 41 which has at its outer end an external gear 42 adapted to mesh with the gear 35 and at its inner end an internal gear 43.

Disposed between the journal bearings 39 and 40 is a sectional drum composed of sections 44, 45 and 46, said drum being preferably cylindrical in form, the end section 44 being provided with a tubular stem 47 which is journaled in the bearing 39 and is provided with a gear 48 which meshes with the gear 11 carried by the drive shaft 13, so that when the drive shaft 13 is rotated the drum will be revolved. The end section 46 of the drum is provided with the tubular stem 49 revolubly mounted in the sleeve 41, the free end of the stem being provided with a tube guide 50 into which the tube is fed.

The end section 46 of the drum carries a stud shaft 51 having a pinion 52 mounted on its outer end which meshes with the internal gear 43 of the sleeve 41 which is driven through the medium of the gears 34, 35 and 42, whereby the stud shaft 51 can be revolved at any speed desired for the purpose hereinafter fully described. The stud shaft 51 carries a worm 53 which is adapted to mesh with worm wheels 54 and 55 mounted on shafts 56 and 57 which are mounted in pivoted arms 58 carried by the intermediate section 45, the free ends of the shafts 56 and 57 being connected together by coiled springs 59. The shafts 56 and 57 carry feed rollers 60 and 61, which are connected to the worm wheels 54 and 55 and the roller 61 is provided with side flanges 62 extending down over the roller 61. The faces of these rollers are provided with transverse ribs for gripping the tube and feeding the same through the machine. By referring to Figs. 4 and 6 it is seen that the rollers are disposed in longitudinal alignment with the tubular stem 49 so that as the tube is fed through the guide it will be gripped by the feeding rollers and carried through the machine. As the drum is revolving at a high rate of speed centrifugal force has a tendency to force the feed rollers outwardly, and in order to overcome the centrifugal force I provide the arms 58 with counterbalancing weights 63 so arranged that the feed rolls will be held together so as to grip the tube.

The free end of the stud shaft 51 is journaled in a suitable bearing 64' mounted on the end of the intermediate section 45, as clearly shown in Fig. 8.

In order to provide means for revolving the tube, I arrange within the intermediate section 45 of the drum a pair of gripping rollers 64 and 65 which are carried by shafts 66 and 67 mounted in pivoted arms 68 carried by the end section 44 of the drum, the free ends of said shafts being connected together by coiled springs 69 so as to hold the feeding rollers in contact with the tube. These rolls are preferably provided with annular ribs so as to grip the tube and revolve the same. The shafts 66 and 67 are forced together by counterbalancing weights 70 carried by the arms 68 so as to overcome centrifugal force as the drum is revolved at a high rate of speed.

From the foregoing description it will be seen that the drum is revolved through the medium of the gears 11 and 48, and as the gripping rollers are carried by members fixed in the drum they will be revolved with the drum so as to rotate the tube as the same is fed by the feeding rollers which are driven through the medium of the gears 35, 42, 43, 52, and worm wheels.

The tubular stem 47 of the drum having the gear 48 at its free end carries a sleeve 72 which is provided with a beveled gear 73 which in turn meshes with a beveled gear 74 carried by a shaft 79 journaled in a sleeve pivotally mounted in the arm 75. The plaiting roller 80 carried by the shaft 79 is held in mesh with the plaiting roller 78 by tensioning means 76 in the form of a spring held in engagement with the pivoted sleeve in which the shaft 79 is mounted by an adjusting screw as clearly shown in Figure 22.

The sleeve 72 is internally threaded to receive a stem 77 of a plaiting roll 78, the face of which is fluted, as shown in Fig. 22. The gear 74 is fixed to the upper end of the shaft 79 and fixed on the lower end thereof is a plaiting roller 80 cooperating with the plaiting rolls 78, as clearly shown in Fig. 8, and between which a thin strip or ribbon 81 of sheet metal is adapted to be fed in such a manner that it will be plaited along its inner edge as shown in Fig. 27 so that when wound upon the tube as the same passes through the plaiting roller 78, the metal will be taken up along its inner edge to compensate for the difference in diameter of the inner and outer edges and to provide a bearing surface or attaching edge whereby the extended radiator surface formed thereby can be securely fixed to the tube as will be hereinafter fully described.

The arm 17 carries a tank 83 adapted to contain acid, and the hub portion 25 of the worm wheel mounted in the bearing 26 carries at one end a disk 84 having curved tubes 85 secured thereto which are adapted to dip into the tank, the inner ends of the tubes being provided with brushes 86 for applying acid between the convolutions of the coils of the extended radiator surface as the tube is fed through the aperture of the disk, and it will be seen that as the disk 84 is rotated the tubes dip into the acid tank and pick up acid which is applied by the brushes to the surface of the tube and plaited edge of the ribbon. Arranged between the disk 84 and around the hub 25 is a casing 87 adapted to receive the surplus acid so that the same will drain back into the acid tank 83.

The other end of the hub 25 of the worm 24 extends over a solder vat 88 and has secured thereto a head member 89 which carries a pair of circular disks 90 connected together by semi-circular blades 91 which terminate adjacent an aperture 92' formed in each disk in such a manner that as the same is rotated the semi-circular blades pick up solder out of the vat and feed it onto the coils and tube of the radiator tube so as to completely coat the surface thereof which causes the ribbon which has been wound spirally on the tube to be soldered to the tube as the same passes between the soldering device composed of the spaced disk and blades. The solder vat 88 has formed in its bottom an air passage 92 which has an inlet 93 and an outlet 94, the passage extending zig zag through the bottom wall thereof, as clearly shown in dotted lines in Fig. 2. An air pipe 95 connected to a suitable source of supply is connected to the inlet 93, and an outlet pipe 96 is connected to the outlet 94, said outlet pipe being extended upwardly and terminating in a nozzle 97 which is adapted to blow the surplus solder from the tube and extended radiating flange, suitable means being provided for collecting the solder thus blown off. A burner 98 is disposed under the vat so as to keep the solder heated to the proper temperature which enables the same to be applied continuously to the tube as it passes through the machine.

The operation of the machine is as follows: A tube of the desired diameter is forced through the tube guide 50 between the feed rollers which grips the tube causing the same to move longitudinally and as the drum containing the feed and gripping rollers is being rotated the tube is gripped by the gripping rollers and revolved. As the tube advances it passes through the lower plaiting roll, and as a strip of flat sheet metal is being fed between the plaiting rolls, the plaited strip is wound spirally around the tube with the plaited edge in contact therewith. The tube then passes through the acid applying brushes which are being rotated which applies the acid bath to the tube between the convolutions of the strip. The tube then passes through the soldering device where the entire surface of the tube and strip is given a coating of solder so that the plaited edge is secured to the tube. The tube in leaving the machine passes under the nozzle of the air pipe through which hot air is being forced so as to blow or remove the surplus solder. It will be seen that tubes of various lengths can be fed into the machine and a spiral radiating flange will be formed thereon and the tube can be cut into the desired length to form radiator tubes after the same has passed through the machine, and in practice instead of running sections of tube through the machine I preferably connect by a coupling member another section of tube to the end of the tube so that the machine runs continuously and a continuous extended radiator surface is wound spirally around the tube or sections of tubes.

As will be understood, the plaiting instrumentality, the acid or flux-applying instrumentality, and the solder-applying instrumentalities are so located relative to each other and to the travelling tube, as to set up the characteristics of individual and independent stations located successively in the path of travel of the tube, the operation at each station being individual to itself, the work-performance at one station preparing the work for the activities at the succeeding station, the stations being arranged so that the work can travel continuously and with constant characteristic throughout the successive stations, enabling the use of a single mechanism for producing the work movement.

This is of advantage in that not only is handling eliminated in transferring the work from one station to another and by the use of simple mechanism, but, in addition, the work performed at one station does not become affected by the activities at a succeeding station. For instance, should the flux-applying station be located in advance of the strip-applying station, the applied flux is inherently affected in the manipulation of the strip in applying the latter to its position, whether the flux be applied to the strip or to the tube; and such location locates the flux applying station far removed from the solder applying station, since the latter can be active only after the strip has been applied; and should the solder-applying station be in immediate proximity to the strip applying station it becomes difficult to prevent the effects of heat application extending into the strip-applying station. By the arrangement employed herein, the several activities take place on the tube in such relation and at such times as to ensure not only the proper positioning of the strip on the tube, but the flux will be applied at such time as to present the coated surfaces to the soldering station with the flux at maximum efficiency to permit soldering to take place. And the activities at the soldering station are such as to not only apply the solder in its most efficient manner—by flowing it in its fluid state under gravity action—but the surplus-removing activity takes place at such time as to practically prevent the soldering hardening and thus requiring reheating to permit removal.

One of the important features that permit this result are the activities in the strip-positioning station. As will be understood, the shaping of the strip to cause the latter to pass from a linear to a spiral form takes place as the strip practically reaches the tube, the shaping or plaiting mechanism itself performing the service of drawing the strip and placing it in position, so that there can be no drawing action placed upon that portion of the strip that was previously positioned when the strip is plaited, its relative position on the tube has been fixed and is not disturbed either by the plaiting of a succeeding portion of the strip or the succeeding activities that secure the positioned strip in position. This becomes of extreme importance under production conditions, since assurance is had that the product will be uniform in characteristic as to the form of the plaits and the position of the strip on the tube. Another great advantage that flows from this arrangement is the ability to employ plaiting elements that are especially designed to produce the proper plaiting action on the strip—the form of the plaits is not left to chance, but is predetermined and assurance is had that each plait will be similar to those that preceded it in applying the strip to the tube. And another advantage comes from the fact that by this arrangement it is possible to apply a strip in such manner that the outer edge of the strip, in applied position, may be free from any corrugated effect, thus setting up the conditions of an applied strip in which longitudinal zones of the strip have different characteristics—part corrugated and part uncorrugated and with the corrugations varying in accordance with predetermined design.

Because of this ability to deliver the tube with its positioned strip unaffected as to position, etc., it is possible to employ the simple flux-applying and solder applying instrumentalities, each of a type adapted to provide for maximum efficiency in operation. And because of the efficiency of the instrumentalities at the successive stations it is possible to set up a speed of travel of the tube through the machine far beyond that heretofore possible in the art, speeds such as has heretofore been referred to, setting up conditions especially favorable for quantity production with the product such as to be uniform in characteristic both with respect to the individual unit and a succession of units.

Another advantage of this construction flows from the ability to produce tubes in continuous lengths. As will be understood, it is possible to feed the tube blanks in immediate succession so that there is a contacting relation between successive tubes at the strip-positioning station, the strip then simply passing from one to the other without break and serving to unite the tubes temporarily while passing through the remaining stations; the tubes are then separated by simply cutting the strip at the proper point. Or, if successive tubes are connected together, as heretofore pointed out, a succession of tubes can be united into a single length, and the latter then cut through the strip and tube to produce any desired product length, it being understood that the presence of the connection at an intermediate point in the length of the final product will not materially affect the operation of the latter in service.

From the foregoing description it will be seen that I have provided a machine for winding an extended radiator surface on a plain tube and for securing said extended surface to the tube in one operation, and while I have shown certain details of construction of the various parts I do not wish to limit myself to these details as my invention consists in providing a machine having means for continuously feeding and rotating a tube in connection with means for plaiting a plain strip or ribbon of sheet metal which is wound spirally around the tube by the rotation of the tube and then subjected to an acid bath and then to a solder bath where it is rigidly attached to the tube.

What I claim as new is:

1. A continuous tube machine for making radiator tubes with extended radiating surfaces, comprising revolving and feeding means for continuously moving and revolving a tube in its passage therethrough, means for winding a strip of metal spirally thereon, and means for subjecting said tube and strip to a soldering bath for securing said strip to said tube.

2. A continuous tube machine for making radiator tubes with extended radiating surfaces, comprising revolving and feeding means for continuously moving and revolving a tube in its passage therethrough, means for winding a strip of metal spirally thereon and simultaneously plaiting the inner edge of said strip, and means for subjecting said tube and strip to a soldering bath for coating and securing said strip to said tube, 3. In a machine for making radiator tubes, the combination with means for continuously revolving and moving a tube longitudinally, of means for plaiting the inner edge of a strip and concurrently therewith, applying the same spirally on said tube by a winding action, and means for soldering said strip to said tube.

4. A machine for making radiator tubes comprising revolving and feeding means for continuously revolving and feeding a tube in a defined path, a plaiting device arranged to plait the inner edge of a strip of metal and wind the same spirally on the tube passing through the machine and means for subjecting said tube and strip to a soldering bath to secure said strip to said tube.

5. A machine for making radiator tubes having extended radiating surfaces, comprising a revoluble drum having means for gripping and feeding the tube in its passage therethrough, a pair of plaiting rolls arranged to plait a strip of thin metal and spirally wind the same on said tube, and means for soldering said strip to said tube.

6. A machine of the kind described comprising a revoluble drum having feeding rollers disposed therein for moving a tube therethrough, means disposed in said drum for gripping said tube and revolving the same, means disposed in the path of travel of said tube for winding a strip of metal thereon, and means for subjecting said tube and strip to a soldering bath for securing said strip to said tube.

7. A machine for making radiator tubes having extended radiating surfaces comprising a revolving drum having a tube receiving end and a tube discharging end, means disposed in said drum for gripping the tube and rotating the same in its passage therethrough, means for feeding the tube through said drum, means disposed at the discharge end of said drum for winding a strip of metal spirally on the tube, and means for soldering said strip of metal to said tube.

8. A machine of the kind described comprising a revolubly mounted drum, means for rotating said drum, a pair of feed rollers disposed in said drum, means for driving said feed rollers, a pair of gripping rollers disposed in said drum, said drum having a tube guide at one end through which the tube passes, means disposed at the opposite end of said drum in the path of travel of said tube for plaiting and simultaneously winding on said tube a strip of thin metal, means for applying acid to said tube between the convolutions of said strip, and means for subjecting said tube and strip to a soldering bath for securing said strip to said tube.

9. A machine of the kind described comprising a revoluble drum having means for feeding and revolving the tube in its passage therethrough, means disposed in the path of travel of said tube for spirally winding a strip of thin metal on said tube, means disposed in the path of travel of said tube for applying acid thereto, means for subjecting said tube and strip to a soldering bath, and means for blowing the surplus solder from said strip and tube.

10. A machine of the kind described comprising a revolving drum having means for revolving and feeding a tubular member therethrough, means disposed in the path of travel of the said tubular members for simultaneously plaiting and winding a strip of thin metal thereon, and means for subjecting said strip and tube to a soldering bath for coating said tube and strip and for securing said strip and tube together.

11. A machine of the kind described comprising a revolubly mounted drum having an opening at one end to receive a tube and an opening at its opposite end to discharge a tube therefrom, means for feeding a tube therethrough and for simultaneously revolving said tube, means disposed at the discharge end of said drum for plaiting and simultaneously winding a thin strip on the outer surface of said tube, means arranged in the path of travel of said tube for applying acid thereto, and means for soldering said strip of thin metal to said tube.

12. A machine for continuously forming radiator tubes having extended radiating surfaces comprising means for revolving and feeding a tube longitudinally, means for winding a strip of thin metal on said tube, means for applying acid to said tube between the convolutions of said strip, means for subjecting said strip and tube to a soldering bath, and means for removing the surplus solder from said strip and said tube.

13. In a machine of the kind described comprising a revolubly mounted drum, gearing for driving said drum, a pair of feed rollers disposed in said drum, means for driving said feed rollers, a pair of gripping rollers disposed in said drum in alignment with said feed rollers for revolving the tube in its passage through said drum, means disposed in the path of travel of said tube for plaiting a thin strip of metal and simultaneously spirally winding said strip on said tube, and means disposed in the path of travel of said tube for subjecting said tube and strip to a soldering bath in its passage therethrough.

14. A machine of the kind described comprising a revolubly mounted drum having means for revolving the same, said drum having a tube receiving end and a tube discharging end, a pair of feed rollers disposed in said drum adapted to feed a tube through said drum, a pair of gripping rolls disposed in said drum for gripping the tube and revolving the same with said drum, means for rotating said feed rollers, and means for applying and securing to said tube a thin strip of metal to form an extended radiating surface.

15. A machine of the kind described comprising a revolubly mounted drum having a passage for a tube, means disposed in said drum for gripping the tube for revolving the same with said drum, means disposed in said drum for feeding a tube therethrough, means disposed in the path of travel of said tube at the discharge end of said drum for plaiting and simultaneously winding on said tube a thin strip of metal, means for applying to said tube and strip acid, and means for subjecting said tube and strip to a soldering bath for securing said strip to said tube.

16. A machine of the kind described comprising a revolubly mounted drum having a tube receiving end and a tube discharging end, means disposed in said drum for feeding and simultaneously revolving a tube in its passage therethrough, means disposed in the path of travel of said tube for spirally winding a strip of metal on the tube, a series of brushes disposed in the path of travel of said tube for applying acid to said tube between the convolutions of said strip, and a soldering device arranged in the path of travel of said tube for coating the surface of said tube and said strip and for soldering said tube and strip together.

17. A machine of the kind described comprising a revolubly mounted drum having a tubular stem at each end, the stem at one end being provided with a tube guide, gearing for revolving said drum, feed rollers disposed in said drum, gearing for revolving said feed rollers for feeding a tube therethrough, gripping rollers disposed in said drum and rotating therewith, for revolving the tube in its passage therethrough, and means for applying and securing a thin strip of metal to said tube for forming an extended radiating surface.

18. A machine of the kind described comprising a revolubly mounted drum having a tubular stem at each end forming a passage for a tube, the stem at one end of said drum being provided with a tube guide, a gear carried by the stem at the opposite end of said drum, a gear meshing with said gear for revolving said drum, a pair of gripping rollers disposed in said drum for gripping the tube and rotating the same with said drum, a pair of feeding rolls disposed in said drum for moving the tube longitudinally through said drum, gearing for revolving said feed rolls, and means disposed in the path of travel of said tube through said machine for winding and securing upon said tube a thin strip of metal for forming an extended radiating surface.

19. A machine of the kind described comprising a tubular drum, means for revolving said drum, means disposed in said drum for feeding a tube therethrough, means for gripping the tube and revolving the tube with said drum, a pair of plaiting rolls disposed in the path of travel of said tube for plaiting the thin strip of metal and simultaneously winding said strip spirally on said tube, a series of revoluble brushes for applying acid to said tube between the convolutions thereof, and a revolving soldering device for coating said tube and strip with solder for securing said strip to said tube.

20. A machine for forming radiator tubes having extended radiating surfaces comprising means for revolving and feeding a tube continuously through the machine, means for plaiting a thin strip of metal and simultaneously winding the same spirally on said tube on its passage through the machine, means for applying acid to said tube between the convolutions of said strip, and means for subjecting said tube and strip to a soldering bath.

21. A machine of the kind described comprising a revolubly mounted drum having a tubular stem at each end forming a passage for a tube, the stem at one end being provided with a gear, a gear meshing with said gear for revolving said drum, a pair of spring actuated gripping rollers carried by said drum for revolving the tube in its passage therethrough, a sleeve surrounding the stem at the opposite end of said drum having an external gear at one end and an internal gear at the opposite end, a gear meshing with the external gear for rotating said sleeve, a pair of feeding rollers disposed in said drum carrying worm wheels, a stud shaft mounted in said drum carrying a worm meshing with said worm wheels, a pinion carried by said stud shaft meshing with the internal gear of said sleeve, and means for winding and securing a strip of thin metal to said tube in its passage through the machine for forming an extended radiating surface.

22. A machine for forming radiator tubes comprising a revolubly mounted drum having means for revolving the same, feed rollers disposed in said drum having independent means for revolving the same, gripping rollers disposed in said drum for gripping and rotating the tube in its passage through said drum, and means disposed in the path of travel of said tube for winding a plaited strip of metal on said tube and for subjecting the said tube and strip to a soldering bath.

23. A machine of the kind described comprising a revolubly mounted drum having means disposed therein for feeding and revolving the tube in its passage therethrough, means disposed in the path of travel of said tube for plaiting a thin strip of metal and simultaneously spirally winding said strip on said tube, a series of revolving brushes disposed in the path of travel of said tube for applying acid to said tube between the convolutions of the strip, a soldering device for subjecting said tube and strip to a soldering bath for securing said tube and strip together, and means for blowing the surplus solder from said strip and tube.

24. A machine of the kind described comprising a drum having means for moving and revolving a tube in its passage therethrough, said revolving means comprising a pair of spring actuated gripping rollers having counterbalancing weights for overcoming centrifugal force, said feeding means comprising a pair of spring actuated feeding rollers having counterbalancing weights for overcoming centrifugal force, means for driving said drum for rotating said drum at one rate of speed, and independent means for driving said feed rollers for revolving said rollers at a different rate of speed.

25. In a machine of the kind described comprising means for continuously revolving and feeding a tube, means for continuously applying to said tube an extended radiating surface, means for applying acid to said tube between said extended radiating surface, and means for subjecting said tube and strip to a soldering bath.

26. A machine for forming a continuous radiator tube comprising means for continuously feeding and revolving a tube, means for continuously applying to said tube a thin strip of metal and simultaneously plaiting said strip, a series of revolving brushes arranged in the path of travel of said tube for applying acid to said tube between the convolutions of said strip, a solder vat, a soldering device comprising a series of blades for dipping into said vat, means for revolving said soldering device for subjecting said tube and strip to a soldering bath, and means for blowing the surplus solder from said tube and strip.

27. A machine of the kind described having means for continuously revolving and moving longitudinally a tube and applying a thin strip of metal spirally thereto, means arranged in the path of travel for coating said strip and tube with solder, and means for blowing the surplus solder from said strip and tube.

28. A machine of the kind described comprising means for winding a plaited strip of thin metal upon a tube, means for applying acid to said tube and strip, means for subjecting said tube and strip to a soldering bath, and means for removing the surplus solder from said strip and tube.

29. A machine of the kind described having means for applying a strip of thin metal spirally to a tube, means disposed in the path of travel of said tube for applying acid to said tube between the convolutions of said strip, and a revolving soldering device arranged in the path of travel of said tube and through which said tube passes for coating said tube and strip with solder.

30. A machine of the kind described comprising means for continuously feeding and revolving a tube, means for plaiting and simultaneously winding a thin strip of metal spirally on said tube, means disposed in the path of travel of said tube for applying acid to said tube between the convolutions of said strip, a soldering device for coating said strip and tube for securing said strip and tube together, and means for removing the surplus solder from said tube and strip.

31. A machine of the kind described comprising a revoluble member having means for continuously revolving and feeding a tube longitudinally therethrough, means disposed in the path of travel of said tube for winding a strip of thin metal spirally thereon, an acid tank, a disk carrying a series of curved tubular members mounted above said tank, said tubular members extending into said tank, brushes carried by the inner ends of said tubular members between which said tube passes, a soldering vat, a pair of revoluble disks extending into said vat having curved blades terminating adjacent openings formed in said disk through which said tube passes, and a hot air nozzle arranged in the path of travel of said tube for removing the surplus solder from said tube in its passage through said machine.

32. A machine of the kind described comprising a revoluble drum having gripping means, means for revolving said drum, feeding means disposed in said drum, means for independently driving said feeding means, and means disposed in the path of travel of a tube through said drum for applying and securing a thin strip of metal to the surface thereof to form an extended radiating surface.

33. The method of making radiator tubes which consists in setting a substantially continuous tubular member in rotary and longitudinal motion and while it is in motion and without interrupting such motion concurrently shaping and positioning upon the outer surface thereof a thin strip of metal to form an extended radiating surface, the shaping and positioning activities being operative to change the strip from its linear form to a spirally-wound formation.

34. In a machine for making radiator tubes, the combination with means for continuously revolving and moving a tube longitudinally, of means for plaiting the inner edge of a strip and simultaneously winding the same spirally on said tube, a solder vat over which said tube is adapted to pass and a revolving soldering device mounted above said vat having passageways through which said tube is adapted to pass for elevating the solder from said vat and applying it to said tube and strip for securing said strip to said tube.

35. A machine for making radiator tubes, the combination with means for continuously revolving and moving the tube longitudinally, of means for plaiting a strip and simultaneously winding the same spirally on said tube, a solder vat over which said tube is adapted to pass, a soldering device mounted above said vat comprising spaced apertured disks provided with blades, the openings of said disks forming a passageway through which said tube is adapted to pass and means for revolving said disks.

36. A machine of the kind described comprising means for winding a plaited strip of thin material upon a tube, revolving means for applying acid to said tube and strip, a revolving soldering device arranged in the path of travel of said tube for applying solder to said strip and tube and means for removing the surplus solder from said strip and tube.

37. In a machine for making radiator tubes, the combination with means for continuously revolving and moving a tube longitudinally, of means for plaiting a strip and simultaneously winding the same spirally on said tube, an acid tank over which said tube is adapted to pass, a disk having a central passageway through which said tube is adapted to be passed, curved tubes secured to said disk adapted to dip into said tank and brushes mounted in the inner ends of said tubes for applying acid between the convolutions of the plaited strip applied to said tube.

38. In a machine for making radiator tubes, the combination with means for continuously revolving and moving a tube longitudinally, of means for plaiting a strip and simultaneously winding the same spirally on said tube, an acid tank over which said tube is adapted to pass, a disk having a central passageway through which said tube is adapted to be passed, curved tubes secured to said disk adapted to dip into said tank, brushes mounted in the inner ends of said tubes for applying acid between the convolutions of the plaited strip applied to said tube and a revolving solder applying device for applying solder to said tube and strip.

39. In a machine for making radiator tubes, the combination with means for continuously revolving and moving a tube longitudinally, of means for plaiting a strip and simultaneously winding the same spirally on said tube, a solder vat over which said tube is adapted to pass, a pair of disks provided with curved blades mounted above said solder vat and into which said blades are adapted to dip, said disks being provided with openings forming a passageway through which said tube is adapted to pass, and means for revolving said disks for applying solder to said tube and strip in its passage through said passageway.

40. The method of making radiator tubes consisting in continuously winding a strip of thin sheet metal spirally on a continuously moving tube, and while said tube is in motion applying acid to said tube between the convolutions of said strip and then applying a solder bath to said continuously moving tube for securing said strip to said tube.

41. The method of making radiator tubes consisting in continuously applying a strip of thin metal to a continuously revolving and moving tube, continuously applying acid to said tube between the convolutions of said strip, and continuously coating said strip and tube with solder.

42. In the art of producing radiator tubes, and wherein the product is in the form of a tube carrying a continuous spirally-wound sheet-metal strip to form the fin, the method of positioning and securing the strip on the tube which consists in establishing a concurrent rotary and longitudinal movement to the tube, and assembling the strip with and securing it in position on the moving tube by a stage operation in which the strip in its linear form is concurrently presented and applied to the tube in definitely-positioned location and in predetermined contour, the flux then being applied to the assembly, after which solder is applied to the fluxed assembly.

43. In the art of producing radiator tubes or the like, and wherein the product is in the form of a tube carrying a continuous spirally-wound sheet-metal strip soldered to the tube to form the fin, the method of assembling the tube and strip to prepare the assembly for the soldering operation which consists in establishing a concurrent rotary and longitudinal movement to the tube, and concurrently presenting the strip in its linear form and applying the presented strip to the moving tube in definitely-positioned location and in predetermined contour.

44. In the art of producing radiator tubes or the like, and wherein the product is in the form of a tube carrying a continuous spirally-wound sheet metal strip soldered to the tube to form the fin, the method of assembling the tube and strip to prepare the assembly for the soldering operations which consists in establishing a concurrent rotary and longitudinal movement to the tube, and presenting a strip to the moving tube in its normal strip or linear form with an edge of the strip in juxtaposition to the tube and concurrently varying the strip from such normal form to cause the strip to conform to the contour of the tube with said edge in contact with the tube.

45. In the art of producing radiator tubes or the like, and wherein the product is in the form of a tube carrying a continuous spirally-wound sheet metal strip soldered to the tube to form the fin, the method of assembling the tube and strip to prepare the assembly for the soldering operations which consists in establishing a concurrent rotary and longitudinal movement to the tube, and presenting a strip to the moving tube in its normal strip or linear form with an edge of the strip in juxtaposition to the tube and concurrently subjecting the strip to a plaiting operation to vary the strip from such normal form and cause it to conform to the contour of the tube with said edge in contact with the tube.

46. In the art of producing radiator tubes or the like, and wherein the product is in the form of a tube carrying a continuous spirally-wound sheet metal strip soldered to the tube to form the fin with the outer edge of the fin substantially free from undulations, the method of assembling the tube and strip to prepare the assembly for the soldering operations which consists in establishing a concurrent rotary and longitudinal movement to the tube, and presenting a strip to the moving tube in its normal strip or linear form with an edge of the strip in juxtaposition to the tube, and concurrently subjecting a zone of the strip extending inwardly from said latter edge to a plaiting operation to vary the strip from such normal form and cause it to conform to the contour of the tube with said edge in contact with the tube.

47. In the art of producing radiator tubes or the like, and wherein the product is in the form of a tube carrying a continuous spirally-wound sheet metal strip soldered to the tube to form the fin, the method of preparing the tube and strip for the application of the solder which consists in establishing a concurrent rotary and longitudinal movement to the tube, presenting and applying the strip to the moving tube in definitely positioned location and in predetermined contour to produce an assembly of uniform characteristic in the direction of length of the tube, and then subjecting the assembly to a fluxing operation with the flux applied to the assembly in conformity with the spiral development of the space between adjacent convolutions of the spiral and at equal speed with the speed of assembly of tube and strip.

48. In the art of producing radiator tubes or the like, and wherein the product is in the form of a tube carrying a continuous spirally-wound sheet-metal strip soldered to the tube to form the fin, the method of positioning and securing the strip on the tube which consists in establishing a concurrent rotary and longitudinal movement to the tube, presenting and applying the strip to the moving tube in definitely-positioned location and in predetermined contour to produce an assembly of uniform characteristic in the direction of length of the tube, then fluxing the moving assembly to prepare it for soldering, and then flowing solder onto the fluxed assembly with the elapsed time between the fluxing and solder application at the same point of the assembly substantially constant as to time-length throughout the length of the assembly.

49. In the art of producing radiator tubes or the like, and wherein the product is in the form of a tube carrying a continuous spirally-wound sheet-metal strip soldered to the tube to form the fin, the method of positioning and securing the strip on the tube which consists in establishing a concurrent rotary and longtudinal movement to the tube, presenting and applying the strip to the moving tube in definitely-positioned location and in predetermined contour to produce an assembly of uniform characteristic in the direction of length of the tube, then fluxing the moving assembly to prepare it for soldering, then flowing solder onto the fluxed assembly with the elapsed time between the fluxing and solder application at the same point of the assembly substantially constant as to time-length throughout the length of the assembly, and then removing the surplus solder with the elapsed time between solder application and removal of substantially constant time-length characteristic.

50. A method as in claim 49 characterized in that the time-length of elapsed time between solder application and removal is materially less than that between the fluxing and solder application.

51. A method as in claim 49 characterized in that the removal of the surplus solder is by flowing heated air upon the moving assembly, with the zone of removal activity in proximity to the solder application to permit surplus removal prior to complete solidification of the solder, and while the assembly is advancing under such concurrent movement.

52. In the art of producing radiator tubes or the like, and wherein the product is in the form of a tube carrying a continuous spirally-wound sheet-metal strip soldered to the tube to form the fin, the method of positioning and securing the strip on the tube which consists in establishing a concurrent rotary and longitudinal movement to the tube to advance the tube relative to successively arranged strip positioning and applying, fluxing, and soldering stations with a constant spiral movement through the several stations, and subjecting the advancing tube to the successive activities of the stations to first position and apply the strip to the tube to form an assembly in which the strip is in definitely-positioned location and in predetermined contour on the tube, then applying the flux to the assembly, and then applying the solder to the fluxed assembly, the successive operations being relatively timed as to provide concurrent activity on a tube of greater length than the distance included within the station zones and with the stations spaced apart distances such as to permit of proper preparation of the assembly in one station for the activities of the succeeding station under relatively high speed operating conditons.

53. In the art of producing radiator tubes or the like, and wherein the product is in the form of a tube carrying a continuous spirally-wound sheet-metal strip soldered to the tube to form the fin, the method of positioning and securing the strip on the tube under conditions of relatively large quantity production which consists in establishing a concurrent rotary and longitudinal movement to the tube to advance the tube relative to successively arranged strip-positioning and applying, fluxing, and soldering stations with a constant spiral movement through the several stations and with the movement producing advance of the tube in excess of five feet per minute, and subjecting the advancing tube to the successive activities of the station to form an assembly of strip and tube in which the strip is in definitely-positioned location and predetermined contour on the tube, then apply the flux to the assembly, then flow the solder on to the fluxed assembly to provide a solder application to the assembly, and then remove the surplus solder prior to solder solidification.

54. In the art of producing radiator tubes or the like, and wherein the product is in the form of a tube carrying a continuous spirally-wound sheet metal strip soldered to the tube to form the fin, the method of producing a source of product supply which consists in establishing a concurrent rotary and longitudinal movement to a succession of alined tubes to produce an advancing movement of the tubes in a spiral path with the rate of advance similar with each tube, then presenting and applying a continuous strip to the advancing succession of tubes with strip application operative to vary the strip form to conform to the tube contour and with the continuity of the strip maintained between successive tubes, then successively fluxing and soldering the assembly during its travel, to complete the product supply source, and then severing the completed assembly at the proper points to separate the supply source into individual products.

55. In the art of producing radiator tubes or the like, and wherein the product is in the form of a tube carrying a continuous spirally-wound sheet metal strip soldered to the tube to form the fin, a strip presenting and applying instrumentality, a flux applying instrumentality, a solder-applying instrumentality, said instrumentalities being arranged relative to a single plane path of travel and in spaced-apart sequence, and means for moving a tube in said path successively through said stations with a continuous spiral movement of constant rate of speed of advance, said instrumentalities being positioned and operative to first present and apply the strip to the moving tube in definitely-positioned location and in predetermined contour, then flux the assembly, and then apply the solder to the fluxed assembly.

56. In the art of producing radiator tubes or the like, and wherein the product is in the form of a tube carrying a continuous spirally-wound sheet metal strip soldered to the tube to form the fin, a strip presenting and applying instrumentality, a flux-applying instrumentality, a solder-applying instrumentality, said instrumentalities being arranged relative to a single plane path of travel and in spaced apart sequence, and means for moving a tube in said path successively through said instrumentalities with a spiral movement and at a continuous and constant rate of advancing speed, said instrumentalities being positioned and operative to first present and apply the strip to the moving tube in definitely-positioned location and in predetermined contour, then flux the assembly, then apply the solder to the assembly by a flowing operation, and then remove the surplus solder in advance of solder solidification.

57. In the art of producing radiator tubes or the like, and wherein the product is in the form of a tube carrying a continuous spirally-wound sheet metal strip secured to the tube to form the fin, a strip-presenting and applying instrumentality, a flux-applying instrumentality, a solder-applying instrumentality, said instrumentalities being arranged in sequence relative to a single plane path of travel and in spaced-apart sequence, and means for moving a tube through said instrumentalities with a spiral movement and at a continuous and constant rate of advancing speed, said instrumentalities being operative to first apply the strip to the tube to form an assembly and then to successively apply the flux and the solder to the assembly, the instrumentalities being relatively positioned to provide successive and individual operation and to permit maintenance of the assembly in such plane by the members of the assembly.

58. In the art of producing radiator tubes or the like, and wherein the product is in the form of a tube carrying a continuous spirally-wound sheet-metal strip secured to the tube to form the fin, a strip-presenting and applying station, a flux-applying station, a soldering station, instrumentalities at the respective stations for performing the work incident to the station treatment, said instrumentalities being positioned to provide work activity on a tube travelling through the stations in a single plane, and means for moving the tube through said station instrumentalities with a spiral movement and at a continuous and constant rate of advancing speed to permit assembly with the strip, fluxing of the assembly, and soldering of the fluxed assembly in succession during advance of the tube in such plane, the stations being relatively spaced to permit individual activity at the station and preparation at one station for the operations of the succeeding station while maintaining the tube within such plane by the members of the assembly.

59. In the art of producing radiator tubes or the like, and wherein the product is in the form of a tube carrying a continuous spirally-wound sheet-metal strip secured to the tube to form the fin, means for moving a tube in an advancing direction with a spiral movement about the tube axis and presenting and applying the strip thereto to form an assembly and securing the strip in position thereon by a fluxing and soldering operation on the assembly, said means including a presenting and applying instrumentality positioned relative to the tube travel path and operative to present the strip in its linear form to the tube and concurrently shape the presented strip to conform to the contour of the tube, whereby the movement of the tube and the instrumentality co-operate to definitely position the strip in its permanent position and with predetermined contour at the time of strip presentation and ineffective to disturb the position of previously-positioned lengths of the strip.

60. An instrumentality of the type and for the purpose of claim 59 characterized in that the shaping activity is provided as the inner edge of the strip reaches the tube to provide concurrent shaping and positioning of such edge on the tube.

61. An instrumentality as in claim 59 characterized in that the strip is presented with its inner edge moving in a plane substantially tangential to the surface of the tube, the shaping activity of the instrumentality being provided as such strip edge approaches and is in the immediate vicinity of the point of merger of the tangent line with the contour circle and with the maximum activity provided at such point of merger.

62. An instrumentality as in claim 59 characterized by a pair of plaiting elements rotatable synchronously with the tube, one of said elements being axially alined with the tube axis.

63. An instrumentality as in claim 59 characterized by a pair of plaiting elements positioned in the path of movement of the strip being presented and having active faces of a contour to provide a generally undulating effect to the inner edge of the strip, said undulations varying in characteristic toward the outer edge of the strip.

64. An instrumentality as in claim 59 characterized by a pair of plaiting elements positioned in the path of travel of the advancing strip and having active faces such as to affect the strip length contour configuration in varying extent in the width of the strip, with the greatest variation at the inner edge of the strip.

65. An instrumentality as in claim 59 characterized by a pair of plaiting rolls positioned in the path of travel of the strip being presented and having active faces dimentioned to be substantially ineffective at the outer edge of the strip to produce a strip configuration wherein the outer edge of the strip is substantially free from undulations.

66. An instrumentality as in claim 59 characterized by a pair of plaiting elements rotatable synchronously with the tube, one of said elements being axially alined with the tube axis, the axis of the other element being inclined thereto.

67. An instrumentality as in claim 59 characterized by a pair of plaiting elements rotatable synchronously with the tube, said elements having their axes inclined relative to each other with the axis of one element alined with the tube axis, said elements having their maximum point of plaiting activity positioned at the point where the inner edge of the strip is brought into position for its application to the tube.

68. In the art of producing radiator tubes or the like, and wherein the product is in the form of a tube carrying a continuous spirally-wound sheet-metal strip secured to the tube to form the fin, means for moving a tube in the direction of its axis with the tube advancing by a continuous spiral movement at a constant rate of speed and presenting and applying a strip thereto to form an assembly of strip and tube with the strip in definitely-positioned location and in predetermined contour and then securing the positioned strip in position thereon by fluxing and soldering operations on the assembly, said means including a flux applying instrumentality positioned to operate on the assembled strip and tube, said instrumentality including a permanently-positioned flux supply tank, and an instrumentality rotatable at synchronous speed with the tube and adapted by its rotation to deliver the flux fluid to the assembly with the flux application at substantially equal advancing speed with that of the strip positioning and applying activity.

69. In the art of producing radiator tubes or the like, and wherein the product is in the form of a tube carrying a continuous spirally-wound sheet-metal strip secured to the tube to form the fin, means for moving a tube in the direction of its axis with the tube advancing by a continuous spiral movement at a constant rate of speed and presenting and applying a strip thereto to form an assembly of strip and tube with the strip in definitely-positioned location and in predetermined contour and then securing the positioned strip to the tube by a fluxing and soldering operation on the assembly, said means including a solder-applying instrumentality positioned to operate upon the fluxed assembly, said instrumentality including a solder supply tank, and mechanism for delivering fluid solder from the tank to the fluxed assembly with the solder application provided at substantially equal advancing speed with that of the flux-applying instrumentality.

70. An instrumentality as in claim 69 characterized in that the mechanism is rotatable about the tube axis at synchronous speed with that of the tube.

71. An instrumentality as in claim 69 characterized in that the mechanism is operative to deliver the fluid solder by flowing the same over the passing assembly.

72. An instrumentality as in claim 69 characterized by the mechanism includes a rotatable bladed formation with the blades of scoop-like contour.

73. An instrumentality as in claim 69 characterized in that the surplus solder is removed from the assembly prior to solder solidification.

74. An instrumentality as in claim 69 characterized by means for removing surplus solder from the assembly by fluid pressure, said means being positioned to be active on the assembly prior to solder solidification.

In testimony whereof I hereunto affix my signature in the presence of two witnesses.

GEZA HORVATH.

Witnesses:
WM. H. KENNY,
HUGH MACKAY.